UNITED STATES PATENT OFFICE.

HENRY D. KENDALL, OF LOWELL, MASSACHUSETTS.

BROWN DYE.

SPECIFICATION forming part of Letters Patent No. 413,724, dated October 29, 1889.

Application filed May 24, 1889. Serial No. 311,986. (Specimens.)

*To all whom it may concern:*

Be it known that I, HENRY D. KENDALL, of Lowell, county of Middlesex, State of Massachusetts, have invented an Improvement in Coloring-Matter, of which the following is a specification.

This invention has for its object the production from coal-tar products of a novel fast brown coloring-matter. The new fast brown coloring-matter may be produced by the action of certain hydrosulphites upon that coal-tar product known to the manufacturing trade as "dinitroso-resorcin," or "Alsace green," or its homologues, dinitroso-cresorcin, &c., and is a compound which, when applied to textile or other fabrics or materials by means of certain mordants and processes well known to the printer and dyer, produces a brown color of exceeding fastness to light, air, soap, washing, acids, or alkalies, and of great brilliancy and purity of shade and tone.

In accordance with my invention, I preferably employ as the base from which to produce my new coloring-matter the body commercially known as "dinitroso-resorcin," or "Alsace green," in the paste form, as usually prepared for commercial purposes, and containing usually twenty-five to thirty per cent. of water. The hydrosulphite employed by me was formally called "hyposulphite," it having the formula $RHSO_2$, in which R represents a base, as sodium, potassium, &c. This dinitroso-resorcin paste I cause to be reacted upon by a hydrosulphite, preferably the hydrosulphite of sodium prepared in the usual commercial manner, and thoroughly incorporated with the dinitroso-resorcin, by which means a reaction is induced resulting in the formation of my new coloring-matter.

In order that my invention may be more readily comprehended, I shall specifically describe one formula (the one which I should preferably employ for commercial purposes) by which the desired result may be obtained; but I do not desire to limit my invention to the exact formula to be described as preferred by me, as it may be varied, and other formulas and substances may be employed, as will be hereinafter described.

Three parts, by weight, of the commercial product dinitroso-resorcin in paste, and containing about twenty-five per cent. of water, are placed in a jar or suitable vessel or receptacle, (preferably of earthenware or wood, and preferably provided with a stirrer or mechanical contrivance, whereby thorough incorporation and agitation of the ingredients may be effected,) and to the dinitroso-resorcin is added, preferably by degrees, one part (by weight) of a solution of hydrosulphite of sodium, $NaHSO_2$, prepared by the well-known method of digesting metallic zinc, twenty-two pounds, in commercial sodium bisulphite solution 35° Baumé (seventeen gallons) in a closed vessel for two and one-half to three hours until the solution is alkaline. The reaction by which the hydrosulphite is formed may be represented as follows, viz: $3NaHSO_3 + Zn = Na_2 Zn (SO_3)_2 + NaHSO_2 + H_2O$. This mixture is kept constantly agitated and a chemical reaction takes place, whereby heat is evolved, the temperature gradually rising to about 135° Fahrenheit, at which point it remains until the reaction is completed, which I have found in practice to take about one hour.

The resulting liquid forming my new fast brown coloring-matter is reddish-brown in color, and may be reduced to any required strength or consistency by admixture with water, in which it is perfectly soluble in all proportions, as also in weak solutions of acids and alkalies. It is slightly soluble in alcohol and substantially insoluble in benzine.

Dinitroso-resorcin or its homologues—such as dinitroso-cresorcin—or any admixture of these bodies, may be used and the reaction effected on them by any of the hydrosulphites, preferably the hydrosulphites of potassium or sodium, which may be prepared by any of the well-known methods, (such as by the action of bisulphite of sodium or potassium on zinc, copper, iron, nickel, &c.,) the shade of brown coloring-matter produced being somewhat modified according to the hydrosulphite employed, the product itself, however, being practically uniform and definite in composition.

My improved coloring-matter may be applied to cotton by means of any of the ordinary mordants, but preferably with chrome mordants, as shades are produced which are absolutely fast to soap, light, air, acids, or alkalies, the said shades being of extreme purity and brilliancy.

On wool or silk it may be fixed by any of the usual or well-known methods, such as by the use of bichromates, &c.

My improved fast brown coloring-matter is amorphous, and may also be mixed freely and in all proportions with the anthracene and similar coloring-matters to produce a variety of shades and colors—as, for example, it may be mixed with alizarine to produce red and violet colors, and with coeruleine, viridine, &c., to produce blue, orange, and other shades or colors, and also it may be applied to the fabrics simultaneously with these coloring-matters, whereby a great variety of shades and effects may be produced, the said shades resulting from the admixture of my improved fast brown with the coloring-matter being made faster than when the fast brown is omitted, or when the said coloring-matters are treated in other methods heretofore used.

I claim—

1. The herein-described fast brown coloring-matter produced from dinitroso-resorcin and its homologues, and having the property of being soluble in water and alcohol and substantially insoluble in benzine, and of being fast to light, air, soap, &c., when fixed upon fabrics, substantially as described.

2. The process of making a fast brown coloring-matter from coal-tar products, which is soluble in water and alcohol and substantially insoluble in benzine, by treating dinitroso-resorcin or its homologues with a hydrosulphite, substantially as described.

In testimony whereof I have signed my name to this specification in the presence of two subscribing witnesses.

HENRY D. KENDALL.

Witnesses:
JAS. H. CHURCHILL,
ANDERS P. MILLER.